United States Patent
Bress et al.

(10) Patent No.: US 7,076,031 B1
(45) Date of Patent: Jul. 11, 2006

(54) SYSTEM AND METHOD FOR TELEPHONE SIGNAL COLLECTION AND ANALYSIS

(76) Inventors: James Russell Bress, 509 Second Ave., Melbourne Beach, FL (US) 32951; Leonard George Bleile, 14 Erin Road, Calgary, Alberta (CA) T2B 3H3; Christopher Henry Becker, 24 Heston St NW, Calgary, AB (CA) T2H 2C1

( * ) Notice: Subject to any disclaimer, the term of this patent is extended or adjusted under 35 U.S.C. 154(b) by 212 days.

(21) Appl. No.: 10/431,493

(22) Filed: May 5, 2003

Related U.S. Application Data

(60) Provisional application No. 60/377,763, filed on May 3, 2002.

(51) Int. Cl.
*H04M 1/24* (2006.01)
*H04M 3/08* (2006.01)
*H04M 3/22* (2006.01)
*H04M 1/00* (2006.01)
*H04M 3/00* (2006.01)

(52) U.S. Cl. .................. 379/23; 379/27.08; 379/32.01; 379/351

(58) Field of Classification Search ............... 379/1.01, 379/21, 23, 24, 26.01, 26.02, 27.08, 29.02, 379/29.03, 29.04, 31, 32.01, 35, 85, 350, 379/351, 353, 377
See application file for complete search history.

(56) References Cited

U.S. PATENT DOCUMENTS

| | | | |
|---|---|---|---|
| 4,467,148 A | | 8/1984 | Stafford et al. |
| 4,924,488 A | * | 5/1990 | Kosich .................. 379/32.04 |
| 5,023,906 A | * | 6/1991 | Novas ..................... 379/372 |
| 5,274,572 A | * | 12/1993 | O'Neill et al. ............ 702/57 |
| 5,448,624 A | * | 9/1995 | Hardy et al. ............. 379/67.1 |
| 5,675,609 A | | 10/1997 | Johnson |
| 5,684,868 A | * | 11/1997 | Alexander .............. 379/140 |
| 5,737,400 A | | 4/1998 | Bagchi et al. |
| 5,787,164 A | * | 7/1998 | Haines et al. ............. 379/372 |
| 5,910,976 A | | 6/1999 | Berthoud et al. |
| 5,937,034 A | | 8/1999 | Kennedy et al. |
| 6,058,172 A | | 5/2000 | Lim et al. |
| 6,215,854 B1 | * | 4/2001 | Walance .................. 379/21 |
| 6,226,369 B1 | | 5/2001 | Lim et al. |
| 6,349,134 B1 | | 2/2002 | Katz |

(Continued)

*Primary Examiner*—Quoc Tran
(74) *Attorney, Agent, or Firm*—Christine Q. McLeod; Beusse Wolter Sanks Mora & Maire

(57) ABSTRACT

An apparatus, system, and method for telephone signal collection, processing, and analysis is provided. The apparatus includes a portable field unit for capturing telephone signal data including (a) a connection interface for connecting to the telephone line and receiving telephone signal data; (b) a signal recorder for digitally capturing the telephone signal data over a specified period by a plurality of simultaneous sampling methods, wherein a plurality of data streams result from each sampling method; (c) data storage for storing the data streams as a data file; and (d) an output port for transmitting the data file to a remote system. The sampling methods comprise distinct sampling rates and/or distinct input sensitivity levels. The apparatus includes in an alternate embodiment a voice recorder for recording a voice file, wherein the voice file is associated with the data file. This will enable the technician to provide input of his observations of the telephone signal. The voice recorder includes a user interface to allow for manual starting or stopping and a speaker is provided for playback. The portable field unit also includes a visual display for displaying AC and DC voltages measured on the connection interface and audio output for playback of telephone signal data and voice data.

48 Claims, 6 Drawing Sheets

U.S. PATENT DOCUMENTS

| | | |
|---|---|---|
| 6,370,244 B1 | 4/2002 | Felder et al. |
| 6,370,484 B1 | 4/2002 | Gorin et al. |
| 6,400,802 B1 * | 6/2002 | Legare .......................... 379/3 |
| 6,404,857 B1 * | 6/2002 | Blair et al. ................. 379/67.1 |
| 6,502,045 B1 * | 12/2002 | Biagiotti ....................... 702/66 |
| 6,584,177 B1 * | 6/2003 | Rizzi et al. ............... 379/32.01 |
| 6,775,240 B1 * | 8/2004 | Zhang et al. ................ 370/251 |
| 6,810,112 B1 * | 10/2004 | Eguchi et al. .................. 379/9 |

* cited by examiner

SYSTEM AND METHOD FOR TELEPHONE SIGNAL COLLECTION AND ANALYSIS

CROSS REFERENCE TO RELATED APPLICATIONS

This application claims benefit to U.S. Provisional Application Ser. No. 60/377,763 filed May 3, 2002, incorporated herein in its entirety by reference.

TECHNICAL FIELD

The present invention relates to telephone signal collection and analysis. More specifically, the invention relates to a system and method for telephone signal collection and analysis for verification and troubleshooting, including caller ID protocols, DTMF, power ringing, single frequency interference noise, call progress tones, facsimiles, and noise. The system also captures signals on power lines.

BACKGROUND ART

All telephone systems need signaling. Signaling provides a number of functions, including, supervising (e.g., line status: busy, idle, etc.), alerting (indicating arrival of a call), and addressing (routing and destination signals). Caller Identification ("Caller-ID" or "CID") signaling is the method of transmitting signaling to Customer Premises Equipment (CPE) for the reception of Caller-ID and other signals. Caller-ID is a generic term most commonly applied to the service provided by a phone company where the Caller-ID signaling is issued be the switching equipment of the telephone company (only once), immediately before or after a first ring indicative of an incoming call.

For testing and troubleshooting purposes, telephone network field service personnel have conventionally employed recording oscilloscopes to capture the signaling. However, these oscilloscopes require specific technical knowledge for proper operation. Moreover, the oscilloscope cannot analyze data; it only presents the waveforms it captures in graphical format.

A number of patents exist which relate to telephony signal capture and analysis including, U.S. Pat. Nos. 6,370,484, 6,370,244, 6,349,134, 6,226,369, 6,215,854, 6,058,172, 5,937,034, 5,910,976, 5,737,400, 5,675,609, and 4,467,148 all of which are incorporated herein by reference.

Therefore, there is a need in the art for a more simplified method of capturing telephony signaling in the field. There is also a need in the art for a system that allows transfer of this data for analysis. Moreover, a need exists for a software analysis method that is simpler and more user friendly.

The present invention is designed to address these needs.

DISCLOSURE OF THE INVENTION

Broadly speaking, the present invention relates to telephone signal collection and analysis. More specifically, the invention relates to a system and method for telephone signal collection and analysis for verification and troubleshooting, including caller ID protocols, DTMF, power ringing, single frequency interference noise, call progress tones, and noise.

The invention can be implemented in numerous ways, including as a system (including a computer processing or database system), a method (including a computerized method for collection of data and analysis), an apparatus, a computer readable medium, a computer program product, or a data structure tangibly fixed in a computer readable memory. Several embodiments of the invention are discussed below.

Preferably, the system comprises two components—the Field Device(s) and the Central Analysis System(s). Broadly speaking, the Field Devices collect data and record signals at the trouble site. The Central Analysis System receives the collected data from the Field Devices for further analysis and viewing. The Central Analysis System may be remote from or combined with the Field Device.

An embodiment of the invention includes the first noted component—the Field Device which is a portable device for collection of data in the field. The Field Device allows easy capturing using a single Start/Stop button. The Field Device further includes advanced triggering functions for capturing signals. All signals on the line are recorded including on hook transitions, off hook transitions, OSI's, Line Reversals, Call Waiting extension in use checks, Voice, DTMF, Call Process tones, FSK for Caller ID, CAS, SAS, DTAS, and any other voice band signal. The Field Device uses multiple A/D converters and a lossless compression scheme to minimize file size. Files are stored locally in memory, such as 256 Mbit FLASH. Captured files are listed in a menu and can be played back locally. The Field Device includes means for transferring the data to a Central Analysis System(s) for analysis. Transfer of data may be by any means known in the art such as direct connection through an output port, modem transmissions, radio, cellular, etc. The Field Device further includes a unique voice recording feature that allows an audio recording to be attached to any data file. This is useful for recording particulars of any data or situation while in the field. The voice recording may be played back locally or by the Central Analysis System, avoiding the need to hand write notes from a trouble site. Separate AC and DC coupled signal capture channels are provided as well as line termination and hook switch control to terminate and decode Type 2 (Off-Hook) Caller-ID.

The embodiment of the invention also includes the second noted component—the Central Analysis System which is a computer system for centralized data analysis. The Central Analysis System preferably contains a database comprising tables of data (including those collected in the field), a display device and a processor unit. The display device has a plurality of display areas (windows). The processor unit operates to access the database to retrieve the data from the corresponding associated tables and then display the retrieved data in the display areas. The processor further operates to analyze the data.

The Central Analysis System includes a unique graphical user interface (GUI) for display on a screen of a computer, including a number of display areas ("windows") for analyzing and displaying data as well as a number of menu items and commands/controls. A variety of formats for analyzing and displaying data is provided. Displays include an AC coupled signal display and a DC coupled signal display as well as detailed signal analysis data in dialog boxes and windows.

As a method of collecting field data, the device includes the steps of connecting to the customer loop at the problem site, recording signaling from the line into a data file, appending any desired voice recordings by the technician onto that data file, optional playback of the data file locally, transfer of the data file(s) to a central analysis system for further analysis. As a method of analyzing data, the method further includes receiving data files from the field, analyzing the data, and displaying data on a display device of a computer system, the display having "windowing" capability to provide a plurality of display areas, including an AC coupled signal display and a DC coupled signal display.

As a computer readable media containing program instructions for displaying data on a display device of a computer system, the data being obtained from a database associated with the computer system, the display having "windowing" capability to provide a plurality of display areas, an embodiment of the invention includes: computer readable code devices for receiving data files from the field, analyzing the data, and displaying data on a display device of a computer system, the display having "windowing" capability to provide a plurality of display areas, including an AC coupled signal display and a DC coupled signal display.

The methods of the present invention may be implemented as a computer program product with a computer-readable medium having code thereon. The program product includes a program and a signal bearing media bearing the program.

As an apparatus, the present invention may include at least one processor, a memory coupled to the processor, and a program residing in the memory which implements the methods of the present invention.

Specifically, in one embodiment an apparatus for telephone signal collection comprising a portable field unit for capturing telephone signal data is provided herein. The field unit comprises (a) a connection interface for connecting to the telephone line and receiving telephone signal data; (b) a signal recorder for digitally capturing the telephone signal data over a specified period by a plurality of simultaneous sampling methods, wherein a plurality of data streams result from each sampling method; (c) data storage for storing the data streams as a data file; and (d) an output port for transmitting the data file to a remote system. The sampling methods comprise distinct sampling rates and/or distinct input sensitivity levels. The apparatus includes in an alternate embodiment a voice recorder for recording a voice file, wherein the voice file is associated with the data file. This will enable the technician to provide input of his observations of the telephone signal. The voice recorder includes a user interface to allow for manual starting or stopping and a speaker is provided for playback. The portable field unit also includes a visual display for displaying AC and DC voltages measured on the connection interface and audio output for playback of telephone signal data and voice data. A user input device is included as well as remote control from a separate system.

The portable field unit can store a plurality of data files, each representing a specified period of captured telephone signal data from one or more distinct telephone lines. This will allow the technician to make multiple recordings at multiple locations prior to transferring the data for further analysis. In an embodiment, the connection interface is a tip ring interface. Moreover, the telephone signal data includes at least one of on hook transitions, off hook transitions, OSI, line reversals, call waiting extension in use, voice, DTMF, call process tones, FSK for caller ID, text messaging, CAS, SAS, DTAS, and voice band signals, as well as any other predefined or predetermined signal.

In a specific example, the signal recorder uses analog-to-digital converters for converting analog telephone signal data into digital signal data. The signal recorder also uses a digital signal processor for receiving the digital signal data, converting the digital signal data into a data file, and automatic naming of the file using a time/date function. The signal recorder has a user interface to allow for manual starting or stopping recording over the specified period or a programmable triggering function for starting or stopping recording over the specified period can be used. Such programmable triggering functions include trigger modes selected from one of Ring/Off hook events, FSK events, CAS events, DC level changes, AC level changes, and user defined events.

The portable field unit also includes an output port with a communication link for transferring the data file to the remote system, such as a central processing system for analysis of the collected signals. The remote system includes a system for analyzing the data file and a system for playback of the voice data and telephone signal data.

The portable field unit also includes a hook switch function allowing the field unit to go off hook and terminate the line as well as a CAS detector that acknowledges call waiting signals on the line. A decoder for Caller-ID is also provided on the portable unit. A system for telephone signal analysis is also provided in an embodiment of the invention which includes (a) communications link for receiving a data file from a remote unit wherein the data file comprises a plurality of data streams recorded using different sampling methods of telephone signal data over a specified period; (b) a signal processing unit for processing the plurality of data streams into a reconstructed telephone signal which substantially represents the telephone signal data recorded by the remote unit; (c) an analyzer for telephone signal analysis; and (d) visual display for graphical output of the reconstructed telephone signal and results of the telephone signal analysis. The data file comprises at least one of (a) on hook and off hook caller ID timings, signaling, and protocols, (b) VWMI timings, signaling, and protocols, (c) DTMF, (d) Call Progress tones, (e) power ringing, (f) single frequency interference signals, (g) power line harmonics, (h) ADSI timing and signaling, (i) Wireline SMS timing and signaling, and (j) FSK signaling. The reconstructed telephone signal is used in a telephone line simulation system. The signal processing unit includes various routines for processing and analysis. For example, it includes a routine operative to modify signals from the multiple data streams into a modified-reconstructed telephone signal which substantially represents the telephone signal data recorded by the remote unit with modifications. It also includes a routine operative to dynamically change signaling definitions. A storage device is provided for storing the data file. The data file further includes pre-recorded voice data associated therewith, whereby the voice data provides an annotated subjective observation regarding the telephone signal data over a specified period. There is also functionality for remotely controlling the remote unit to provide for remote controlling of start/stop or triggering of the recording over the specified period.

The system also includes a routine operative to classify the data according to predetermined criterion. The classification may include protocol analysis. The signal processing unit comprises a routine operative to display the protocol analysis of the classified signals and also a routine operative to indicate out of range data according to predetermined criterion.

In a method in accordance with the present invention, data is captured by a field unit by the following steps: (a) receiving telephone signal data; (b) recording AC and DC data samples; (c) merging AC and DC data samples into single data stream; (d) rotating data stream through pre-trigger buffer; (e) monitoring for trigger event; (f) if trigger event, then creating a new file, else return to step (e); (g) streaming data from pre-trigger buffer into the new file; (h) if stop or timeout event, then stop streaming data into the file and close file, else return to step (g); and (i) return to step (e). The method further includes recording voice data and associating the voice data with the new file. Moreover, the method further includes transferring the file from a field unit to a remote signal analysis system. The transferring includes the steps of: (i) confirming connection of field unit to remote signal analysis system; (ii) transferring a file list from field unit for display on remote signal analysis system; (iii) receiving selection of files for transfer; (iv) transferring a selected file from a field unit to a remote signal analysis system; (iv) decompression of data from the selected file; (v) parsing AC and DC data samples from the selected file; (vi) conditioning of AC and DC samples; and (vii) displaying of AC and DC samples on remote signal analysis system.

In another embodiment of the invention a method of data analysis of telephone signal data on a remote signal analysis system is provided wherein the data is transferred from a field unit to the remote signal analysis system, by: (a) receiving an analyze event command; (b) performing a power spectral analysis on the data, wherein the data comprises AC and DC data; (c) dividing the AC and DC data into time domain regions based on power spectral analysis; (d) performing fast Fourier transform on each of the regions; (e) classifying each region by comparison to predetermined criteria; and (f) displaying parametric properties for each region.

In another embodiment, a method of data analysis for CAS tone of telephone signal data on a remote signal analysis system is provided wherein the data is transferred from a field unit to the remote signal analysis system, by: (a) receiving data from field unit; (b) performing power spectral analysis on AC portion of data; (c) determining start and stop points of individual signals as regions; (d) applying CAS filter to data by removing all outside frequencies; (e) performing FFT on data; (f) searching for frequencies corresponding to predetermined frequencies for CAS; (g) comparing duration of region to predetermined duration for CAS; (h) comparing frequency amplitude to predetermined amplitudes for CAS; (i) comparing differences in frequency amplitude (twist) to predetermined amplitudes for CAS; (j) as a result of the comparisons of steps (g)–(j), graphically displaying the region as a CAS tone. The method also includes displaying parametric data wherein the parametric data comprises at least one of duration, amplitude, and twist.

Therefore, it is an object of the present invention to provide a device for collection of field data. It is a further object of the present invention to provide a central analysis system for receiving the collected field data and provide signal analysis in a user friendly manner.

The advantages of the invention are numerous. One significant advantage of the invention is that it allows a technician to easily collect field data without having particular knowledge or expertise in signal analysis. Another advantage is the ability to append voice recordings to the data files prior to sending the filed to the central system for analysis. Another advantage is the centralized analysis provided by the Central Analysis System and its unique graphical user interface which allows signal analysis including: Caller-ID and signaling, VMWI timing and signaling, DTMF, Call Progress tones, Power Ringing, Graphic display of signal parameters, trigger modes to capture specific signals, On-Hook and Off-Hook Caller-ID Timings and Protocols, Single frequency interference tone and Power Line Harmonics.

As a result, signal collection and analysis can be completed in a more convenient and less complicated manner.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
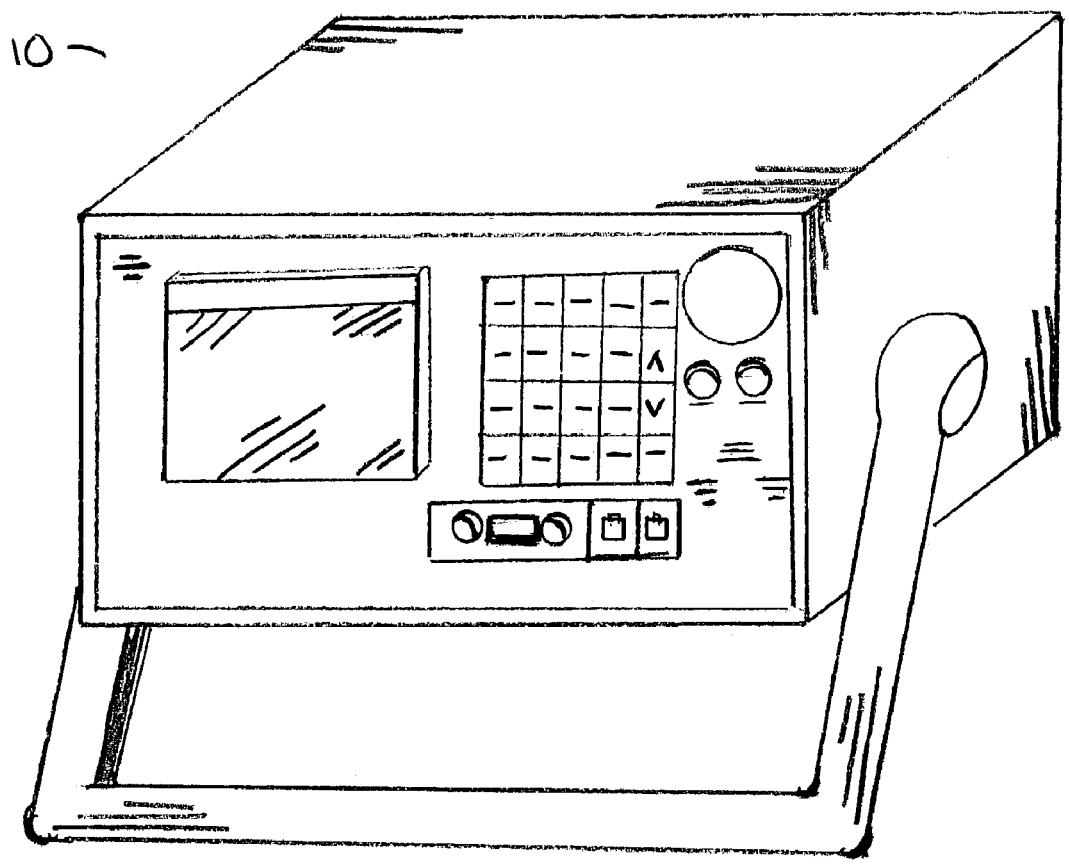
FIG. 1 is perspective view of the field data collection device of the present invention.

It should be understood that in certain situations for reasons of computational efficiency or ease of maintenance, the ordering and relationships of the blocks of the illustrated block diagrams and flow charts could be rearranged or re-associated by one skilled in the art. The ordering and content of the exemplary display screens may also be rearranged. While the present invention will be described with reference to the details of the embodiments of the invention shown in the drawing, these details are not intended to limit the scope of the invention.

DETAILED DESCRIPTION OF THE PREFERRED EMBODIMENT

Referring now to the drawings, the preferred embodiment of the present invention will be described.

I. Hardware

Data capture is handled by the device 10 shown in FIG. 1, referred to herein as the Field Device or Data Capture Field Device. Generally, the Field Device 10 interfaces to a local telephone loop as known in the art. It collects data through analog to digital converters and stores it in FLASH memory. The device includes LCD, keypad, and user interface software to facilitate this process. The data can be transferred to a PC or Central Analysis System for analysis via a serial port or modem or the like. Alternatively, other techniques for communicating with other computing platforms can be used, including, for example: infrared, universal serial bus (USB), RS-232, Ethernet, Firewire and RF communication methods. In addition, information transfer may be accomplished by various intermediate memory storage devices, such as memory cards, diskettes, or PCMCIA cards. Signals can be easily captured using a single Start/Stop button. There are also advanced triggering functions for capturing signals. All signals on the telephone line are recorded. This includes signals such as On hook transitions, Off hook transitions, OSI's, Line Reversals, Call Waiting extension in use checks, Voice, DTMF, Call Progress tones, FSK for Caller ID, CAS, SAS, DTAS and any other voice band signal. In addition, capture of specific signals may be selectively programmed.

The invention preferably uses multiple Analog to Digital converters, such as 16 bit A/D converters, and a lossless compression scheme to minimize file size. Files are stored locally in on board memory, for example, 256 Mbit FLASH memory. Alternatively other memory storage formats may be used to store recorded files, such as RAM, memory cards, diskettes, or PCMCIA cards. Files that have been captured are listed in the File menu and can be played back locally. In an embodiment, data files are transferred to the software running on a Central Analysis System via the serial port or the V.90 modem. The method of transfer may be any means known in the art including, but not limited to, universal serial bus (USB), parallel port interface, or a wireless interface such as 802.11 or Bluetooth.

The device uses a unique memory structure to allow it to be field upgraded. There is a memory device which includes instructions on where to fetch the executable This "boot loader" program code is only used at power up and does not contain any of the "run time" SW. The boot loader instructs the on board microcontroller (DSP) where to find the program code and how to load it into the microcontroller's memory for execution. After it is loaded, the microcontroller begins executing the program code. The device can contain multiple versions of program code and it has the capability to determine which one should be run on power up. In this way the "boot load" program can remain static and the device is able to execute different versions of program code. The various program codes need not contain the same features. New program code files can be transferred from a PC into the unit via the serial port, parallel port, modem or wireless means. Program files are encoded using a proprietary scheme so that simple hex files are not transferred over non-secure links.

The invention has a voice record feature that allows verbal transcription and an "audio tag" to be attached to any data file. This is useful for recording particulars of any data. The voice file is transferred to the software along with the data file and can be played back locally or on the Central Analysis System or other PC running the software. This eliminates the need to transfer hastily written notes from a trouble site to the point of analysis. Voice recordings also provide permanent records of where the file was recorded, what the suspected problem was and what equipment was being tested. In addition, the voice recordings are automatically time and date stamped for later reference.

The invention utilizes a protocol that allows other operating conditions or data to be passed from the capture device to the Central Analysis System or other PC running the software. This could include but is not limited to information about the format of the data, sample rate, compression scheme, data format, identification of device which recorded the data, SW version of the device which recorded the data, user settings of the device which recorded the data or others. The data may be encoded in a compression format before it is sent to the Central Analysis System.

Figure 2:
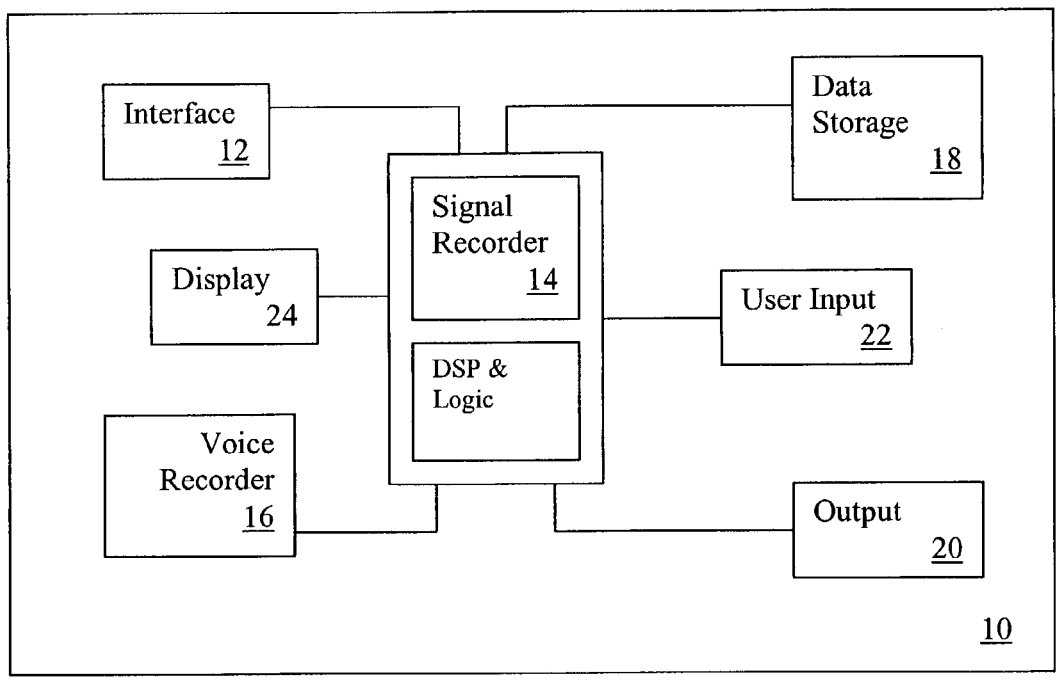
FIG. 2 is a simplified block diagram of an embodiment of the field collection device.

FIG. 2 shows a simplified block diagram of an apparatus for telephone signal collection which includes a portable field unit 10 for capturing telephone signal data wherein the field unit comprises: (a) a connection interface 12 for connecting to the telephone line and receiving telephone signal data, (b) a signal recorder 14 for recording the telephone signal data as a data file, (c) a voice recorder 16 for recording audible voice data; (d) data storage 18 for storing the data file and voice data; and (e) an output port 20 for transmitting the data file and voice data to a remote system. Other outputs include a speaker to output the signals and a serial link. The device further includes user input 22 and display 24. The signal recorder 14 includes A/D converters and digital signal processors for processing of the received signals. A logic device is also included to control the unit, including signal recording. Optionally, the device includes a hook switch and CAS/FSK detect circuitry.

Figure 3:
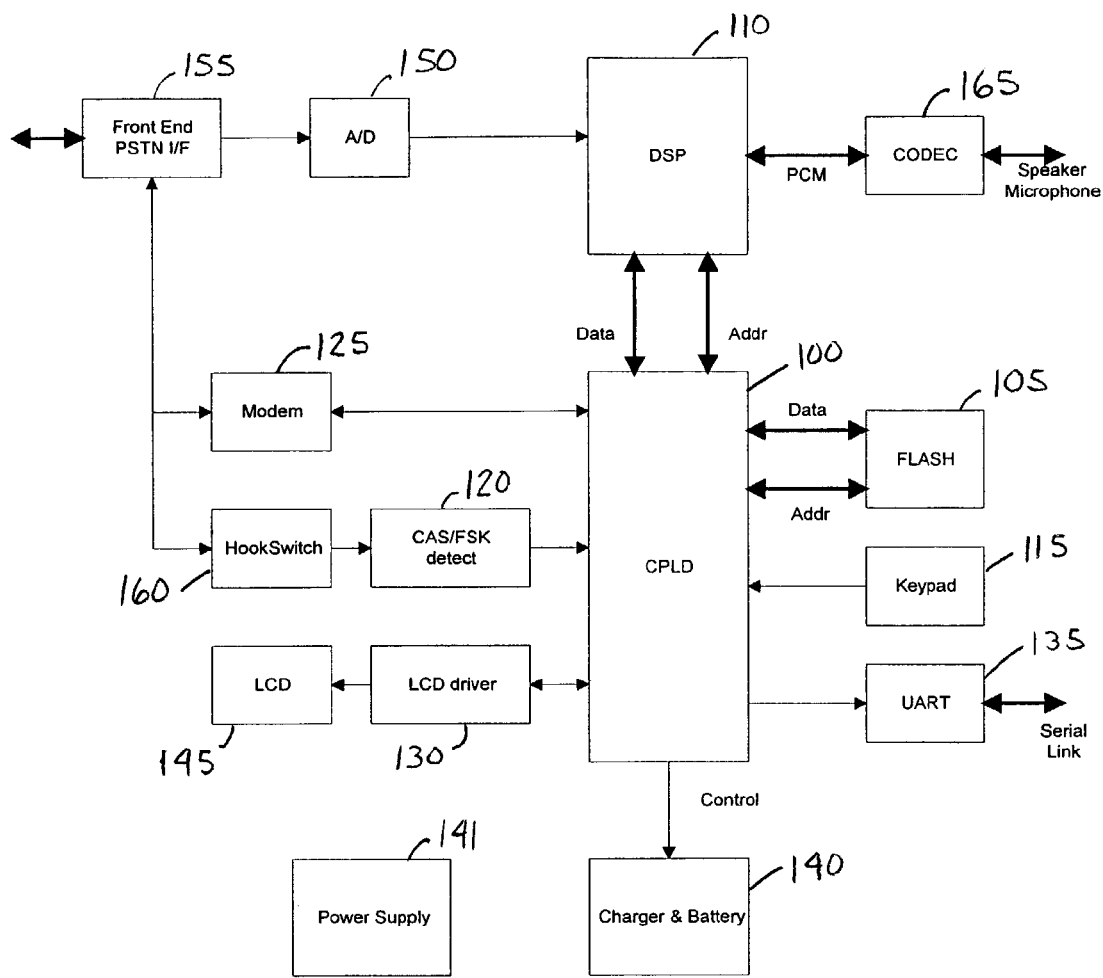
FIG. 3 is a functional block diagram of an embodiment of the field data collection device of the present invention.

FIG. 3 shows an exemplary functional block diagram of a specific embodiment of a field data collection device of the present invention. At the heart of the device lies a programmable circuit, for example, a complex programmable logic device (CPLD) 100 connected to storage, such as connected by bus to a FLASH memory 105 and a processor, such as a Digital Signal processor (DSP) 110. Alternatively, CPLD 100 could be an FPGA, ASIC, microprocessor or other custom designable or programmable electronic device known in the art. CPLD 100 receives input, such as from a keypad 115 for manual control and detect circuit, such as a CAS/FSK Detect Circuit 120 for signal analysis. In addition, CPLD 100 is bidirectionally coupled to a communication link such as modem 125 to receive and transmit information externally. A display is provided comprising for example, an LCD driver 130 to receive input from and control an LCD display 145. CPLD 100 also may control a universal asynchronous transmitter-receiver (UART) 135 which provides a serial link for external communications and a charger/battery 140 to control battery power and charging for the unit. In addition a power supply 141 is provided for connecting to the mains and providing power to the unit for operation and battery charging.

In operation, the DSP 110 receives digital input from analog to digital converter 150 which converts analog signal from a front end, Public Switched Telephone Network (PSTN) interface 155. PSTN Interface 155 is also bidirectionally connecter to modem 125 to receive and transmit information externally and a hook/switch circuit 160 that provides selectable on line/off line control and further provides a signal to the CAS/FSK Detect Circuit 120. DSP 110 is also bidirectionally connected to a coder-decoder (CODEC) 165 using a pulse code modulation interface to send and receive digitized voice signals to a speaker/microphone (not shown) for recording and playback of voice transcription information. It should be understood that the arrangement and or composition of the depicted blocks can be rearranged or substituted while still remaining within the scope of the invention.

B. Method

Figure 4:
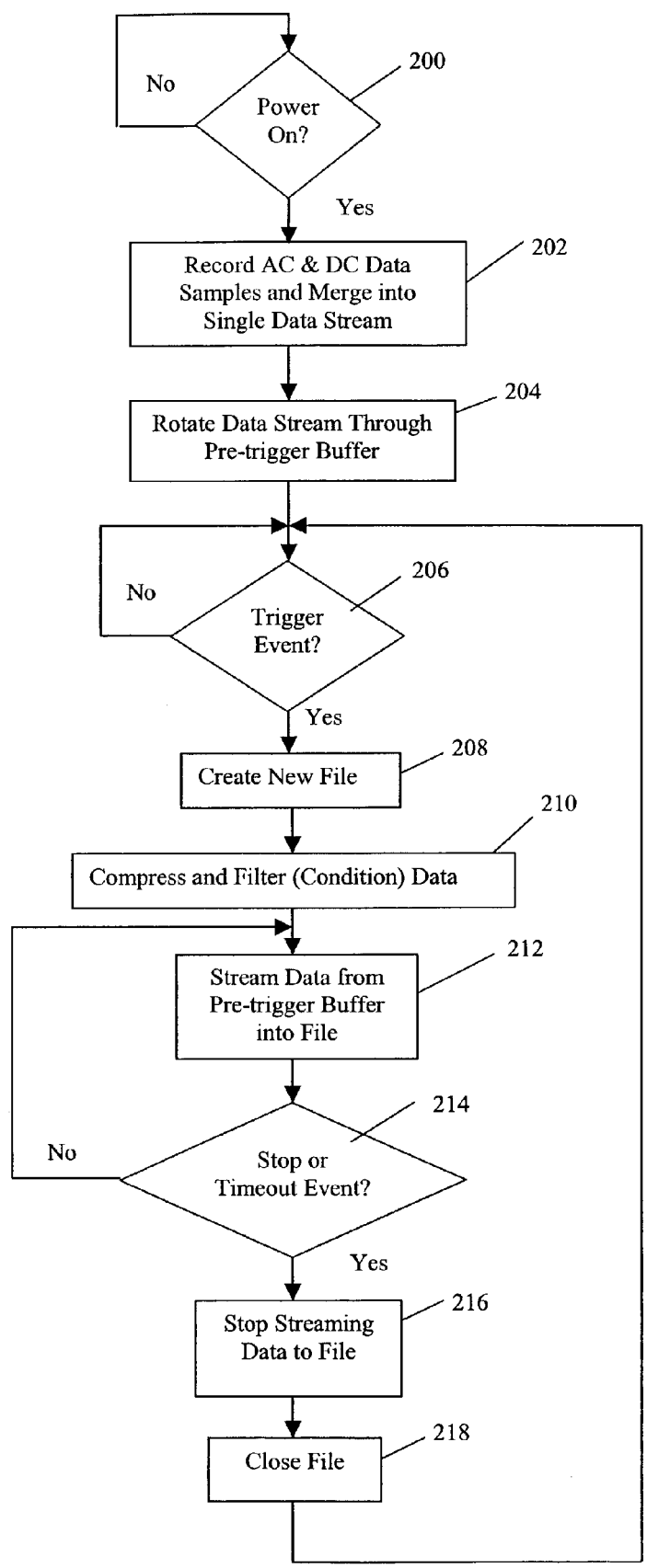
FIG. 4 is flow chart of a data capture method of the present invention.

FIG. 4 is flow chart of a data capture method of one embodiment of the present invention. When powered on 200, the system converts and records AC and DC data samples and merges the samples into a single data stream 202. As the data is captured, the data is rotated through a pre-trigger buffer 204 on a FIFO basis. The system then waits for a trigger event 206, and if a trigger event occurs, a new file is created 208. The data in the buffer is then compressed and filtered, or conditioned, 210, and the data is continually streamed from the pre-trigger buffer into the file 212 until the system receives a stop command, or a timeout is reached 214. When a stop command or timeout occurs, the system stops streaming data to the file 216, and closes the file 218. After the file is closed, the system continues to wait for a trigger event in step 202.

Figure 5:
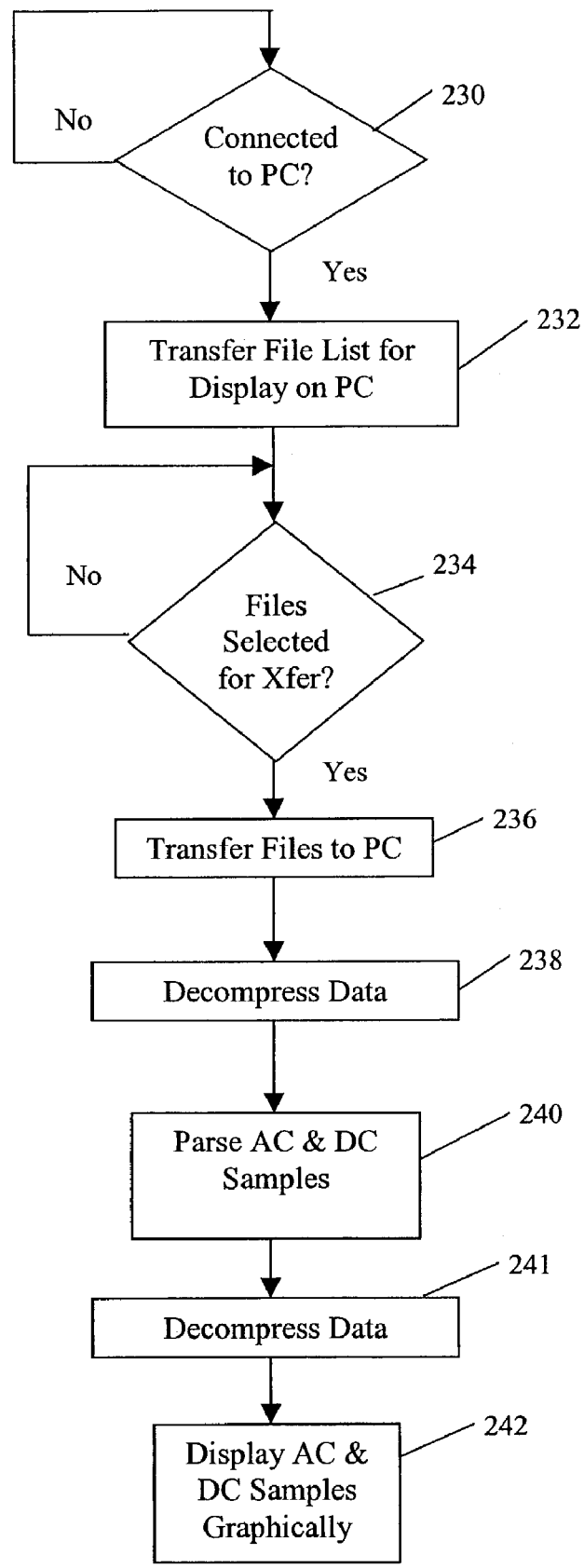
FIG. 5 is flow chart of a data transfer method of the present invention.

FIG. 5 is flow chart of data transfer method of the present invention. When the system is connected to a PC for uploading of data 230, a file list of files stored in memory is transferred to the PC 232. The system then waits to determine if any files are selected for transfer 234 and transfers files to the PC according to selections 236. Once transferred, the file data is decompressed 238 and parsed into AC and DC samples 240. The selected parsed AC and DC samples are filtered and conditioned 241 and displayed on the PC 242.

Figure 6:
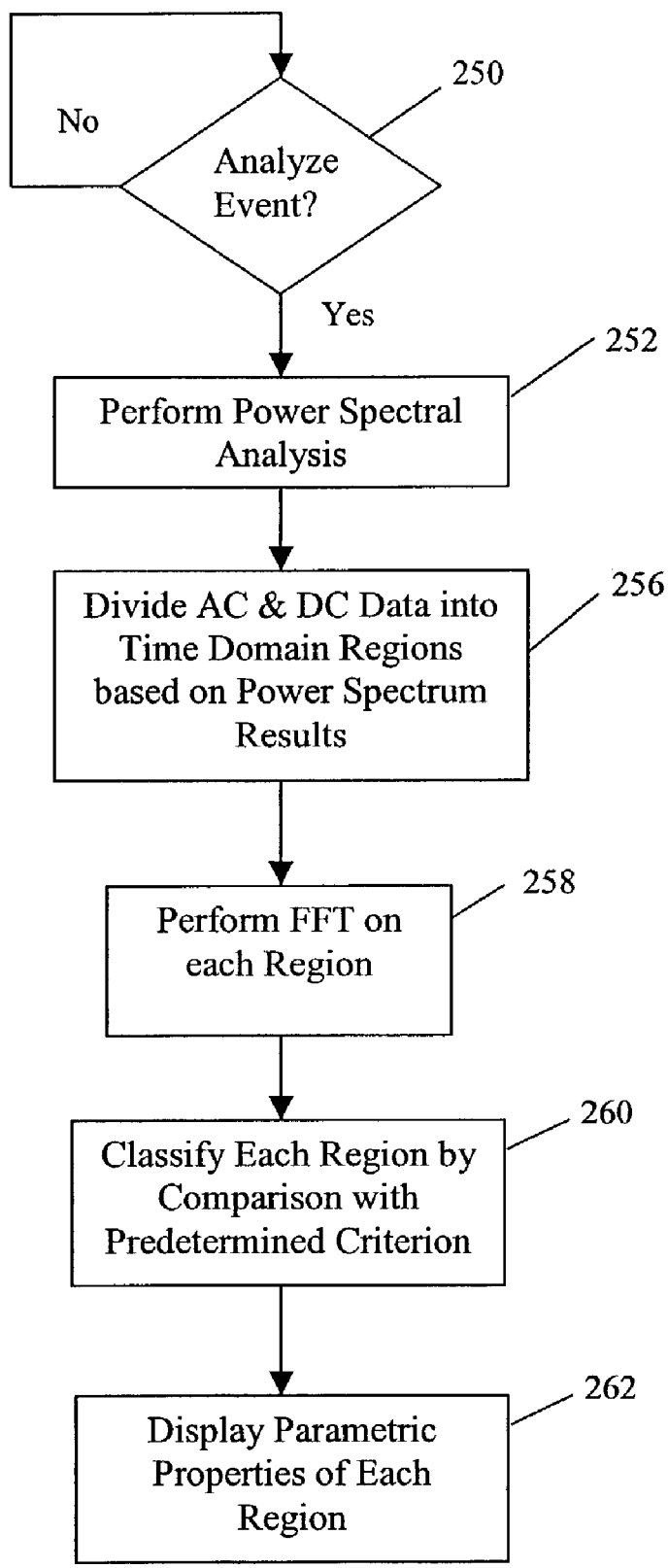
FIG. 6 is flow chart of a data analysis method of the present invention.

FIG. 6 is flow chart of the data analysis method of the present invention. Once data is uploaded to the PC, the system waits for an analyze event command 250. If directed to analyze an event, the system performs a power spectral analysis 252. The AC and DC data is then divided into time domain regions based on power spectrum 256. Next, a fast Fourier transform (FFT) is performed on each region 258 and each region is classified by comparison with a predetermined criterion. Finally, the parametric properties of each region are displayed 262.

In a specific embodiment of the invention, the device comprises the following features:

A. Hook Switch Key

This Hook Switch key allows the unit to go off hook and terminate the line. While off hook the CAS detector is turned on and the unit ACKnowledges (DTMF 'D') call waiting CAS signals on the line and displays the call-waiting caller ID on the LCD. The dial pad is functional while the unit is off hook. In the off hook state, the unit turns on the speaker so the telephone line can be monitored similar to a traditional "butt-in set". An icon or other indicia on the LCD display indicates the hook switch state of the unit.

B. Start/Stop Key

The Start/Stop Key starts and stops a manual recording. The device preferably has a recording time of one minute for any one file. The device includes a compression algorithm, as known in the art, that reduces file size from 20% to 49% depending on the signal being recorded.

C. Dial Pad Keys

The dial pad is used to enter a modem access number for connection to a remote system or PC for analysis (Central Analysis System). In the Transfer Files menu, the '*' key is used to enter pauses (KW, IDX) that might be required when connecting via a modem. The '*' key is used to toggle between a Data file or a Voice note file when in the View Files menu. In the View Files menu, the '#' key is used to select files for uploading (KW, IDX) to a remote computer via the modem. The dial pad is also active when the unit is off hook and DTMF digits are routed out to the telephone line.

D. Arrow Keys

The UP and DOWN arrow keys are used to navigate through the menu and file lists. They can also be used to control the speaker volume when the speaker is active. The speaker is active while the device is off hook, when it is in monitor mode and while a file is being recorded.

E. Voice Record Key

This is used to start and stop a voice recording. Pressing the "VOICE NOTE" key while viewing a data file in the file list enables the microphone and starts recording a voice note file. After pressing the VOICE NOTE key, you speak and record details about the site or customer problems that are noted. Pressing the VOICE NOTE key again stops the recording. The voice note has the same name as the data file with a 'V' appended to it. Pressing VOICE NOTE if a voice note already exists will erase the existing file and start a new voice note recording. Pressing VOICE NOTE from the idle state is a short cut to the last data file in the directory. Pressing VOICE NOTE twice will start recording a voice note for the last data file with only 2 key presses.

F. Clear Key

This is a delete key and is used as a destructive backspace when editing a modem access number or the time and date. It is also used to delete data files and voice recordings.

G. Enter Key

The Enter key accesses menu items and is used for activating certain activities such as dialing a number for a modem connection.

H. Status LED

When the device is powered on and not recording, the green Status LED will flash with a 10% duty cycle and a 2 Hz rate ("blip" flash). When a file is being recorded the green Status LED will flash with 50% duty cycle at a 2 Hz rate (steady on/off). The status bar will also display the "Rec" prompt in the top right of the screen to indicate that a file is being recorded. The Green Status LED flashes rapidly to indicate that there is an error with the firmware. In this case the firmware must be reloaded.

I. Charge LED

When the Device is charging the internal battery; the Red Charge LED is on steady. Once the battery is fully charged the Red Charge LED is turned off.

J. FW Beep Codes

The Device performs various low level diagnostics on power up. Error conditions are indicated with "beep codes." When powering up the Device, a single SHORT beep indicates that the last firmware update had an error and an older version is being used. In this case, run the FW update wizard in the Device, Update Firmware menu and download the latest FW again.

K. Flash Beep Codes

The Device performs various low level diagnostics on power up. Error conditions are indicated with "beep codes." When powering up the Device the following beep codes indicate an error in the flash file system: SHORT SHORT, SHORT LONG, LONG, LONG LONG. In these cases it will be necessary to run the flash eraser utility. This will reinitialize the entire flash memory and reset it to default. The Green Status LED will flash rapidly as a further indication of this error.

L. Menu Items

There are 9 menu items on the Device. The current menu item and the total number of items are displayed on the status line. Pressing the Menu key enters and exits the list. Pressing the Enter key accesses the menu item. The items are summarized below 1. File Transfer This selection allows files to be transferred using the internal modem. The telephone number is entered via the dial pad. After a number is entered, pressing ENTER causes the modem to dial the number and connect to a remote device. Pauses in dialing are entered using the '*' key. The Clear key acts as a backspace. When connecting via the serial port to a computer, files are selected for upload. When connecting via the modem to a computer, files are selected for upload before the connection is made. Files are selected for uploading with the '*' key while in the View Files menu. Pressing the '*' key toggles the upload status of a file. A prompt indicates the current upload status of the file. When selected for upload, both the Data file and the Voice recording are sent to the connected computer.

2. View Files

This selection allows the files in the memory to be viewed. The up and down arrow keys navigate through the list. The current file and the total number of files are displayed on the status line. If a voice recording exists it will also be shown. Voice recordings have the same name as the corresponding data file with a 'V' appended to the name. If a Voice recording exists, pressing ENTER will toggle between the voice recording and the data file. Pressing the '#' key will play the voice recording if it is selected. Pressing VOICENOTE will record a new voice recording if none exists or overwrite an existing voice recording if one already exists. Pressing the CLEAR key will delete the existing voice recording if it is selected. Pressing CLEAR will delete both the data file and the voice recording if the data file is selected. A voice recording cannot exist without a corresponding data file. If a voice recording exists, pressing ENTER toggles the cursor between the data file and the voice recording. Pressing the '#' key will playback whichever file is selected. Selected files are shown in reverse video. Files are selected for uploading with the '*' key while in the View Files menu. Pressing the '*' key toggles the upload status of a file. A prompt indicates the current upload status of the file. When selected for upload, both the Data file and the voice recording are sent to the connected computer. Pressing CLEAR while the View Files prompt is selected will delete all the files in the directory.

3. Line Monitor

Entering the monitor mode from the menu, allows the line to be monitored with the speaker on the unit. The LCD also displays the AC and DC voltages measured on the tip ring interface. The measurements are updated every second, the AC measurement is a peak hold measurement so that the maximum value is indicated. The DC level is an average level over each second. The Monitor is used to audibly listen to the signals on the telephone line. It is also used to give an indication of the voltage properties of the telephone line. These measurements are useful when setting Triggers to begin automatic recording.

4. Trigger Source

This option allows you to select and arm the trigger modes. The device can trigger from: Ring/Off hook events, FSK events, CAS events, DC level changes, and AC level changes. Pressing the UP and DOWN ARROW keys cycle through the trigger choices. Pressing ENTER toggles the ON/OFF status of a trigger. If the DC or AC level trigger is turned on, you are prompted to enter a voltage at which to trigger. Entering a value of '0' will turn the trigger off. You can enter both positive and negative DC trigger levels. The "#" key is used to enter negative numbers.

5. Trigger Time

This option allows you to select how long the device will record data on the line after a trigger condition is met. The files can be from 1 to 9 seconds long. There is a 500 ms pre-trigger buffer which captures signals preceding the trigger event.

6. Volume Control

The speaker volume can be adjusted using the UP and DOWN ARROW keys. The options are OFF, LOW and HIGH. The volume control can also be accessed using the UP and DOWN ARROW keys at any time that the speaker is active. The speaker is active when the Device is off hook, in monitor mode or during a recording.

7. Time and Date

This item allows you to adjust the time and date. The new time and date are stored back into the battery backed up real time clock. The time and date are used as the basis for the file naming system.

8. Backlight

The ENTER key allows you to cycle the backlight options between ON, OFF and AUTO. AUTO mode is used to conserve battery power and turns the backlight off after 30s of inactivity. The backlight will come on when a key is pressed on the Device.

9. System

This item displays the remaining time left in the FLASH memory. It also indicates software version information and hardware ID number.

M. Data Files

Files are preferably stored in the FLASH memory of the device. The files include the data for both the AC and DC views as well as any voice recordings. Files are automatically named using a real time stamp. The user is not required to enter a file name. The format is preferably: YYYY-MM-DD_HHMM.SS. The time is in 24-hour format. The naming convention allows files to be sorted chronologically in a database if desired. Each device has a unique hardware ID that is displayed along with the file name when files are transferred to a PC.

N. Recording Manually

In order to record signals manually, the START/STOP key is pressed when the unit is idle. This key is inactive when in the menu. The top left of the status bar will show "Rec" when the unit is recording a file. The elapsed time and the time available in the FLASH memory are also displayed. If the transient prompt "Can't create file" appears it indicates that the flash file system could not open a new file due to a lack of available memory or a file with the same name already exists. The unit records all AC and DC signals present at the Tip/Ring interface until the START/STOP button is pressed again.

O. Enabling a Trigger

If the signal of interest has known properties it is possible to use a trigger to capture the signal. The system has a pre-trigger buffer to capture events immediately preceding the signal of interest. When a trigger is armed, the status bar indicates, "Trig" in the top right side. When the trigger condition is met and a file is being recorded, the status bar displays "Rec" in the top right side. Data files generated by trigger events are 5 seconds in length. There are five types of triggers:

1. Ring/Off Hook Trigger

This trigger is preset to look for large changes in the DC or low frequency levels such as caused by power ringing or an on hook to off hook transition.

2. Type 1 FSK Trigger

This trigger is preset to look for the channel seizure signal in an FSK transmission and begin recording. This could be used to trigger on Type 1 FSK for delivering caller ID or VMWI with or without ringing. This trigger is not suitable for type 2 caller ID transmissions. This trigger is mutually exclusive of the CAS trigger.

3. CAS Trigger

This trigger is preset to look for CAS tone signals and begin recording. This could be used to trigger on Type 2 Caller ID. This trigger is mutually exclusive of the Type 1 FSK trigger. If the CAS trigger is set and on-hook FSK is delivered without a CAS tone the FSK data will not be displayed on the box.

4. DC Level Trigger

The system can be set to trigger and start recording if the DC signal level rises above a preset point. This would typically be used to trigger when a telephone line goes from an "idle" to an "in-use" state. The monitor mode displays an averaged DC value for reference. A negative sign can be entered using the "#" key.

5. AC Level Trigger

The system can be set to trigger and start recording if the AC signal level rises above a preset point. This works best if the AC level of the signal of interest is above the noise floor of the telephone line being tested. Using the monitor mode allows the user to see a peak AC level on the line. It is important to note that any spurious noise spikes that rise above the preset value will cause the unit to trigger and record a data file. Examples of signals that could be captured with an AC trigger include FSK, DTMF or Ringing. The monitor displays the peak AC value in a one second interval.

P. Uploading Files

Once data and voice recording files have been recorded, they can be sent to a central system for analysis. This can be done via an internal V.90 modem or with an 115,200 baud RS232 serial connection or other means known in the art, such as infrared, USB, Ethernet, Firewire or RF communication methods. When the Device 10 is in communication with a modem or serial port, the hardware does not allow any new files to be recorded. The display shows the connected ICON and the message "Serial port in use" when connected to a serial port or modem.

Q. Modem

Using the UPLOAD FILES option in the Menu, a user can enter a phone number to connect to a remote system (PC). The dial pad allows the entry of digits, the CLEAR key acts as a backspace and the "*" key is used to enter pauses. The software can be configured to auto-answer incoming calls. This is done via the Device menu item. Once a modem connection has been established the dialog box will display any files that have been selected for upload, these will be sent to the host system. Progress bars indicate the status of the download process. Connections between the Device and a host system via the modem are intended to be automatic and do not require user intervention at the host system side.

R. Serial Port

Connecting a serial port to a host system allows the devices to communicate. The "Connect" option in the "Device" menu will initiate communications. Once a serial port connection is established, the software will display the list of data files that reside on the Device's FLASH memory. The dialog box will indicate the total number of files that are in FLASH. One or more files can be selected for download to the host system. Progress bars indicate the status of the download process. Alternatively, USB, parallel, infrared, Firewire, Ethernet, or other communication methods known in the art could be used.

S. Deleting Files

Pressing the CLEAR key while the "View files" option is selected in the menu will erase all the files in the directory. Pressing the CLEAR key while an individual file is selected will erase that particular file only. Voice recordings can be erased independent of their respective data file. Pressing ENTER while viewing a file toggles between the data file and the Voice recording. Pressing CLEAR while the Voice recording is selected will delete only the Voice recording. Pressing CLEAR while the data file is selected will erase both the Voice recording and the data file.

T. Specifications

The device has the following preferred specifications in one embodiment of the invention: Tip Ring Interface, On hook, AC: >200 kohms, DC: >500 kohms, Off hook, AC: 600 ohms+/−5%, DC: 200 ohms+/−5%, AC View, Bandwidth: 150–7000 Hz, +/−, 0.5 dB, Dynamic Range: 4 Vpp, Sensitivity: −60 dBm, DC View, Bandwidth: 0–150 Hz, Dynamic Range: +/−400 Vp, Sensitivity: 250 mVp, DC level tolerance: +/−5%, File Transfer, Modem: V.90, Serial Port: 115200 baud.

II. Analysis Software

A. Overview

The software is used to view and conduct in depth analysis on captured telephone signals. It can decode a wide range of type I and Type II FSK signals as well as other signaling tones such as DTMF, Ring and Call Progress tones. A serial port or modem connection is established between a computer running the software and the capture device. Files are selected for transfer and sent to the computer. Once imported the files are analyzed. The software will then display all the signals it found in the file as well as the properties of each signal that it detected.

The analysis portion of the software is used to reconstruct events that were recorded. These events are then displayed exactly as they appeared while being recorded. Power spectral and frequency domain algorithms are used to convert the data into the final format. All analysis parameters are user changeable to allow customization of how the final reconstructed signal show be analyzed and ultimately displayed. Each pre defined signal type has a set of associated physical properties that must be met to be classified. This could include such things as duration, frequency content, relationships between frequencies and other properties. There is provision to allow a user to custom define a signal type to cover signals not previously categorized. The unit utilizes a multiple A/D input to achieve a wide dynamic range. This allows large signals such as ringing which may be hundreds of Volts as well as small signals such a caller ID FSK transmissions below 1 mV to be recorded at the same time. This is something not available on any other devices. It is possible to achieve this with a single A/D or with multiple A/D's. A further aspect of the invention allows the signal to be manipulated after it is transferred to the PC. Unwanted signal components can be removed to focus on desired signals. This is accomplished with a series of pre-set or user defined filter options.

The data may also be manipulated by changing the viewing perspective with respect to time or amplitude (zooming). Once the data is captured, it may be reconstructed identically or with modifications which help diagnose a problem. Further to this, the data may then be stored in a format that is suitable for regeneration. A format has been defined to allow the data to be transferred to signal generators. This provides a method of capturing a local or remote event and manipulating the data then regenerating it. Problems that occur in the field can now be captured, analyzed, manipulated and used to fix device failures. The location of any of these actions is no longer a factor. An engineer can repeatedly replay past events that may have occurred remotely with the use of this device. This is a powerful tool that is not available in the caller ID telephony field today A preferred embodiment of the software will now be described.

B. Menu Items

The menu is broken up into several categories with options to control the look, feel and operation of the software. The following section explains the menu items are to give users an understanding of the programs operation.

1. File->Open. This is used to load previously saved files. A shortcut to this option is provided by pressing on the toolbar.

2. File->Close. Close an open document (Prompt to save if appropriate).

3. File->Save. Save the current document. A shortcut to this option is provided by pressing on the toolbar.

4. File->Save As. Save the current document and prompt for new filename

5. File->Print. Prints the current document. A shortcut to this option is provided by pressing on the toolbar.

6. File->Print Preview. Displays a preview of what will sent to the printer.

7. File->Print Setup. Displays your printer settings.

8. File->Exit. Closes the program.

9. View->Analyze. Begins analyzing waveform for signals on both the ac and dc channel. The analysis will take place between any cursors that are on the current view or on the entire visible portion of the waveform. This operation automatically finds all possible signals in the waveform. The analysis is controlled by parameters that have been optimized to detect the widest variety of known signals on a telephone line. The options are found under the tools menu item. The analysis occurs in two passes, the first pass is a power spectrum analysis that looks for the start and stop of signals based on power and creates "regions". The second pass analyzes the frequency content of each signal region to determine the signal type and signal properties. A shortcut to this option is provided by pressing the appropriate icon on the toolbar 10. View->Analyze (Section). Section analyze is used when signals were not automatically detected. There are instances where a signal is very far out of specification. An example would be an FSK signal with 20 dB of twist. Such a signal would not be detected in the automatic analysis since the power spectrum analysis will partition the FSK into separate signals. You can force an analysis on a desired section of the waveform by selecting an area with the cursors and using the section analyze capability. The software will then perform an analysis using only the frequency content, not the power spectrum analysis. A shortcut to this option is provided by pressing the appropriate icon on the toolbar.

11. View->Zoom In. Once a section of the screen has been marked with the view cursors you may click this item to have the software zoom in on a particular section. A shortcut to this option is provided by pressing the appropriate icon on the toolbar.

12. View->Previous View. A record of previous views is kept so that if you are zoomed in to an area and would like to go back to another view of the waveform choose this option to cycle through your previous views. A shortcut to this option is provided by pressing the appropriate icon on the toolbar.

13. View->Full Screen. This option will remove any zooming feature that has been enabled and show you the entire captured waveform. A shortcut to this option is provided by pressing the appropriate icon on the toolbar.

14. View->Crop Selection. This will remove all information relating to the capture except for the section marked by the cursors on the screen. This feature is good for cutting your file size down to only include the section of a capture that you are interested in. Cropping will only remove the end points of a file. It is not possible to remove sections from midpoints of a file.

15. View->Frequency Domain. This brings up an FFT window that shows the frequency domain of a section of the capture. This is useful to determine frequency content of captured signals. The input to an FFT is not an infinite time signal. In a real system it is not possible to always capture exactly one period or a multiple of periods of a signal. In most cases, leakage in the FFT output will result. One method of reducing this leakage is called windowing. The TSA analysis software uses a Hanning window function to reduce the leakage effects and provide greater amplitude accuracy on captured signals.

16. View->AC/DC Properties. This menu item will toggle a window showing properties of a selection or waveform. The window indicates peak AC and DC properties of the section of the waveform that is on the screen. A shortcut toggle this window is provided by pressing the appropriate icon on the toolbar.

17. View->Gridlines. Use this item to toggle the gridlines from the graph

18. View->Lock Vertical Axes. When enabled (which is the default) this option will ensure that while zooming on a capture you don't loose your vertical aspect. It can also be toggled if you hold down the shift key while you are selecting an area of the waveform on the screen.

19. View->Lock AC/DC. Enabling this option (which is the default) will ensure that while zooming in on either the AC or DC channel the waveforms stay in sync along the time axes. So if you zoom in on the AC channel the DC channel will automatically zoom in to follow the AC selection. When the views are not locked, zooming in on either the AC or DC view is independent of the other view. An indication of your position within the overall waveform is shown n the un-zoomed view. When zooming with the views unlocked the un-zoomed view always displays the complete waveform.

20. View->Auto Vertical Zoom. Enabling this option (which is not the default) will automatically scale your vertical axes as you zoom. This option automatically adjusts the vertical scale to optimize the waveform view. For example, if you zoom in to a section of a waveform with low amplitude signals, the vertical scale automatically adjusts so that the signal is visible. This can also be accomplished manually by unlocking the vertical axes when zooming.

21. View->Toolbar. This option toggles the appearance of the toolbar.

22. View->Status Bar. This option toggles the appearance of the status bar.

23. View->Properties. This will bring up the appropriate dialog box of properties on the currently selected analyzed signal. Double clicking on sections of an analyzed waveform also brings up the dialog box of properties.

24. Filter->All Pass. Removes any previously applied filters. Pressing the appropriate icon on the toolbar provides a shortcut to this option.

25. Filter->Band Pass. Applies a Band pass filter. This is useful to remove out of band frequency components from a file. All frequencies below 300 Hz and above 3400 Hz will be removed. This is useful in the case where there is strong out of band signals that distort in band telephony signals such as DTMF or FSK. Applying the filter allows the telephony signals to be viewed and analyzed. It is therefore possible to determine if the signals were within specification independent of the out of band interference. This band pass filter is a combination of the low pass and high pass filters. Pressing the appropriate icon on the toolbar provides a shortcut to this option.

26. Filter->Low Pass. Applies a Low pass filter. This is useful to remove high frequency noise from a signal. For example, applying the high pass filter to a file with frequency components above 3400 Hz allows the data to be viewed with the 60 Hz component removed. The filter 3 dB point is set at 3400 Hz. A shortcut to this option is provided by pressing the appropriate icon on the toolbar.

27. Filter->High Pass. Applies a High pass filter. This is useful to remove low frequency noise from a signal. For example, applying the high pass filter to a file with a strong 60 Hz component will allow the data to be viewed with the 60 Hz component removed. The filter 3 dB point is set at 300 Hz. Pressing the appropriate icon on the toolbar provides a shortcut to this option.

28. Audio->Play->Data. Plays the data file out the speakers of the computer. The TSA software will play whatever portion of the data file that is displayed on the screen, this may be the entire file or a zoomed portion of the file. If cursors are active, the TSA software will play only the portion between the cursors. Selecting Play while a data file is currently being played will stop the playback. Pressing the appropriate icon located on the toolbar can also play data files.

29. Audio->Play->Voice Note. Plays attached voice note. The entire voice note is played regardless of the zoom level of the data file. Voice notes can also be played by pressing the appropriate icon located on the toolbar.

30. Audio->Remove VN. Removes any voice note from the data file.

31. Device->Connect. Begins a serial connection with the TSA device. If Auto export is selected, a file is created in the directory specified in Device->Settings. The file name is "export.csv." The file is in "comma-separated-variable" format and can be opened by XL or other database applications. This option sets up the TSA SW to automatically analyze files as they are received and store the analysis details in the XL file for later manual viewing or data analysis.

32. Device->Auto Answer. Sets the program to automatically answer incoming calls on the specified modem chosen in Device->Settings.

33. Device->Settings. This option allows you to configure your serial and modem connection options. It also controls the auto-backup modes. When the back up option in the Device->Settings Dialog or the Auto export option in the Download Dialog are selected, the TSA software automatically saves a copy of all files transferred to the PC in the directory specified here. If Auto export is selected then an XL file detailing the hit analysis is also saved in this directory.

34. Device->Update Firmware. Launches the Firmware upgrade wizard to upgrade the TSA box with newer firmware.

35. Tools->Options. Opens the options dialog box where you can change settings that affect how the program analyses and decodes signals.

36. Window->Cascade. Cascades all the open windows.

37. Window->Tile. Tiles all the open windows.

38. Window->Arrange Icons. Arranges all minimized icons.

39. Help->Contents. Opens the help dialog.

40. Help->Index. Opens a searchable help index.

41. Help->License Info. Displays the license agreement for the TSA application.

42. Help->About. Displays program credits and information.

C. Viewing

The current cursor position is indicated on the status bar near the bottom of the screen. The difference in time (delta) between the start and stop of a selected area is also indicated in the status bar.

1. AC View

The AC view shows the AC coupled signal. This window can be zoomed in both the vertical (amplitude) and horizontal (time) axes. Signals identified with either a manual or automatic analyses are shown across the top of the view in what is called a "hit-line." The hit-line is context sensitive to display as much information as possible according to the zoom depth. Hovering the mouse over an identified signal ("hit") brings up a summary of information in a tool tip. Double clicking a hit will display a dialog box with the full details of the signal.

2. DC View

The DC view shows the DC coupled signal. This window can be zoomed in both the vertical (amplitude) and horizontal (time) axes. Signals identified with either a manual or automatic analyses are shown across the top of the view in what is called a "hit-line." The hit-line is context sensitive to display as much information as possible according to the zoom depth. Hovering the mouse over an identified signal ("hit") brings up a summary of information in a tool tip. Double clicking a hit will display a dialog box with the full details of the signal.

3. Analysis View

This view shows the results of any analyses that have been performed. The format is identical to what is sent to the printer. This view is blank until an analysis is performed. It is below the DC View and is minimized by default. It can be viewed by dragging the bar below the DC window.

D. Analyzing

1. AUTOMATIC

The software can automatically analyze a file and report standard telephone signals that are detected. This is initiated by pressing the "A" on the tool bar. This function will detect most telephony signals. A prompt appears in the status bar during an analysis. Once the analysis is complete all detected signals are displayed in the "hit-line" above the waveform. The hit-line is context sensitive and displays as much of the signal name as possible. Zooming will cause more of the name and details to be displayed. If there is no room for a signal name it is indicated by an exclamation character '!'.

2. MANUAL SELECTION

The user can select any portion of a data file and perform an analysis in that area. The system performs a generic tone analysis as well as an FSK analysis if the signal has energy in the FSK band. Pressing the "S" on the tool bar initiates the analysis of a selection. The manual analysis allows signals with very low amplitudes, high distortion or high twist to be detected. A prompt appears in the status bar during an analysis. Select an area for analysis by left clicking the mouse at any point on the waveform to place a cursor, keeping the mouse button down and dragging the second cursor to the desired point.

3. HIT-LINE

A 'hit' is defined as a detected signal in the AC or DC view. If a manual or automatic analysis is complete and a hit is found, it is displayed in the top portion of the view. The hit line indicates the hit length and name. The hit line is context sensitive so that it will always display as much information as possible depending on the zoom depth. For example, an FSK hit in full screen mode may show the name "FSK" and a duration. As you zoom in, more details will appear, the hit line is capable of showing information down to the 'bit' level.

4. ANALYSIS RESULTS

After an analysis is performed data for each hit is displayed in dialog boxes. To display the hit analysis parameters double click on the signal of interest at any point below the hit line.

5. FSK SIGNALS

The FSK dialog box displays the following properties:
Parametrics

1. Mark and Space Frequency, Amplitude and Twist

2. Channel seizure—number of bits of channel seizure and indication of dropout

3. Mark Preamble—number of bits of mark preamble before data and indication of dropout 4. MarkOut—number of bits of mark trailing the checksum and indication of dropout 5. Stuffed Mark—indication of stuffed mark in data transmission 6. Framing errors—indication of missing start or stop bits in data transmission 7. SNR—indication of signal to noise ratio of the FSK demodulator. This includes only the noise present in the FSK demodulator bandwidth 8. SFI—indication of strongest single frequency interference tone outside the bandwidth of the FSK demodulator. Examples would include low frequency tones below the frequency of a typical FSK signal or high frequency tones above the frequency of a typical FSK signal. Performing an FFT on an FFT signal will show all the frequencies present.

9. Channel seizure delay—Type 1 FSK transmission only

10. Ack delay—Type 2 FSK transmission only

11. FSK delay—Type 2 FSK transmission only

Data

1. Message Type

2. Checksum valid or invalid

3. Raw data—in hex, ASCII or decoded in text format

6. DTMF SIGNALS

The DTMF dialog box displays DTMF properties.

7. CAS SIGNALS

The CAS dialog box displays CAS properties.

8. TONE SIGNALS

The tone frequencies, amplitudes and twist are shown. Any interference tones are also displayed. The tone list is sort able by frequency or amplitude.

9. ZOOM

When viewing a file it is possible to zoom in on sections of the waveform. There are 4 options controlling the zoom functionality. Zooming options are found in the View menu. Zoom functions are accessed by using the Zoom icons in the toolbar or the right mouse menu. In order to select an area for to zoom click your left mouse button and select the entire region you wish to zoom, then release the mouse button. If you have selected to lock the vertical axis then you will select the entire area from left to right, otherwise you will have selected a specific area. Once you have an area selected you may zoom in on the selection through the menu item View->Zoom In or the Zoom In button on the toolbar. Once a selection has been made you may alter it by placing the cursor over any edge of the selection, then with the left mouse button down you may drag the edge to enlarge or shrink the selected area as you would resize any normal window. If at any time you have a selection on the screen but the Zoom In option is unavailable, try enlarging the zoom area as there are limitations to the depth at which you may zoom. The software will also remember the previous areas that were selected and at any time if you wish to see a prior view of the signal you may choose the previous zoom level by choosing View->Previous from the menu or on the toolbar. You may also remove the zoom at any time and return to the full view of the signal by choosing Remove Zoom from the toolbar or by using the menu item under View.

10. LOCK/UNLOCK A C/DC VIEW

Locking the AC/DC views will cause all windows to be synchronized along same time period. When the lock AC/DC is not enabled you may only zoom in on one graph at a time to keep the display reasonably easy to interpret.

11. AUTO VERTICAL ZOOM

Enabling the Auto Vertical Zoom feature can make it easier to detect small signals. When zooming in with this feature the software will automatically calculate the largest peak-to-peak value within the section and vertically zoom in at a level that enables the user to reasonable see that signal.

12. LOCK VERTICAL AXES

When enabled this feature will allow you to zoom in on the time axis without affecting the voltage scale. This feature is recommended along with the Auto Vertical Zoom feature to allow you to track down signals quickly and efficiently. Holding down the left shift key while making your selection temporarily toggles this feature.

13. DIALOGS

Each hit has a corresponding dialog box. Specialized dialog boxes in the AC view include: FSK, DTMF, ACK, CAS, SAS and RING. Specialized dialog boxes in the DC view include: EIU check, LINE REVERSAL, OSI, ONHOOK, OFFHOOK. Both views support a generic dialog box for generic tones. This would include signals such as single frequency interference. Each dialog box has a button to perform an FFT on the hit.

14. FFT

The right mouse menu allows the user to perform an FFT over a selected area. The FFT dialog box has a peak detector that allows a user to determine the predominant frequency and amplitude components of a signal. The FFT dialog box also displays a frequency and amplitude list of the 10 highest peaks. The longer the selected area the more accurate the FFT. It is recommended that selections for FFT's performed in the AC view be at least 40 ms long. It is recommended that selections for FFT's performed in the DC view be at least 100 ms long. The TSA analysis software uses a Hanning window function to reduce the leakage effects and provide greater amplitude accuracy on captured signals.

15. PLAYBACK a. Data Files

When a file is loaded into PC memory it can be played back for audible verification. Pressing the "Play AC" icon in the toolbar or via the Audio menu item plays the file. Pressing play will play the portions of the file that are visible on the screen, or the portion of the file that is within the cursors. Data files can be played back on the TSA device by selecting a data file and pressing the '#' key.

b. Voice Notes

If a data file has a corresponding Voice Note, pressing the "Play Note" icon in the toolbar or via the Audio menu item will play it. Voice notes can be played back on the TSA device by selecting a voice note file and pressing the "#"

16. SAVING

The software can automatically save a copy of all files transferred to the PC by enabling the backup option in the Device->Settings Dialog from the menu bar. Files can also be renamed using the Save As function in the file menu. The files are saved in .acd format and all data and voice notes are saved in the same file.

17. PRINTING

The AC view, DC view and Analysis View can be sent to the printer. The AC and DC views are printed as they appear on the screen. This means that you can zoom in to an area of interest before printing.

18. SETTINGS

There are settings and options provided within the program that the user can adjust.

a. Device

For proper operations during serial and modem transfers you must let the TSA software know with which of your computers devices you would like it to connect. Under the Device->Settings menu option you are presented with several options. The first is which Serial Port you would like to use for serial communications with the TSA box (You must also attach a serial cable between your computer and the box). You are also presented with a list of modem's that have been detected within your computer, choose the preferred modem device and set whether you would like TSA to automatically accept inbound calls on that modem.

b. Options

There are options within the TSA program to define the parameters of the signals that can be detected and decoded. The sections can be separated into three main categories, Signal Detection, Tone Decoding and FSK Decoding. Tone decoding configurations are straightforward and all work in the same fashion, you can set tone value, the maximum variation as well as minimum power requirements and durations. Signal Detection and FSK Decoding options are more complicated and control most aspects of the software including the demodulation delay and dropout thresholds. Generally the options have been placed at default to accept a wide variety of Type I and Type II caller id signals and should only be changed by experienced users.

i. Signal Detection

Signal Detection is separated on several tabs. The following is a list of related tabs and their individual options:

Tone:
DC_MIN_LENGTH_DFT
AC MIN_LENGTH_DFT
MIN_FREQUENCY
MAX_FREQUENCY
DFT_WINDOW_MIN_FRQ
DFT_WINDOW_BRK_FRQ1
DFT_WINDOW_BRK_FRQ2
DFT_WINDOW_BRK_LVL1_dB
DFT_WINDOW_BRK_LVL2_dB
DFT_MAX_DYNAMIC_RANGE_dB
Minimum Tone Power
Minimum Description Power Threshold
Analyze:
DC_MAX_VARIATION_START_V
DC_MIN_VARIATION_STOP_V
DC_STEADY_STATE_COUNT
AC_THRESHOLD_dbVrms
SAT_RECOVERY_Sx
AC_BPF_DETECT_Sx
AC_BPF_SSTATE_Sx
AC_BPF_VARIATION_dB
AC_FINE_EDGE THRESHOLD
EIU:
Voltage Threshold—Allows you to choose the Line Reversal Voltage Threshold
Minimum Duration—Allows you to configure the minimum EUI check duration
Maximum Duration—Allows you to configure the maximum EIU check duration
OSI:
Voltage Threshold—Allows you to change the OSI Voltage threshold Line Reversal Voltage Threshold—Allows you to choose the on-hook/off-hook Voltage threshold ii. Tone decoding Tone decoding is separated so that each signal has it's own tab. The following is a list of related tabs and their individual options:

ACK:

ACK Notification—Let's you choose either DTMF A, DTMF D or both as your CPE ACK notification signal.

Minimum Power—Allows you to choose the minimum power required for the signal to be accepted as valid +/−Allowable Error—Error in percent that the signal frequencies are allowed to vary and still be considered acceptable.

Busy:

High Frequency—Allows you select the high frequency component of the signal.

Low Frequency—Allows you to select the low frequency component of the signal.

Minimum Power—Allows you to choose the minimum power required for the signal to be accepted as valid +/−Allowable Error—Error in percent that the signal frequencies are allowed to vary and still be considered acceptable.

CAS:

High Frequency—Allows you select the high frequency component of the signal.

Low Frequency—Allows you to select the low frequency component of the signal.

Minimum Power—Allows you to choose the minimum power required for the signal to be accepted as valid Minimum Duration—Allows you to choose the minimum duration that the signal must be present in order to be accepted as valid.

+/−Allowable Error—Error in percent that the signal frequencies are allowed to vary and still be considered acceptable.

Dialtone:

High Frequency—Allows you select the high frequency component of the signal.

Low Frequency—Allows you to select the low frequency component of the signal.

Minimum Power—Allows you to choose the minimum power required for the signal to be accepted as valid +/−Allowable Error—Error in percent that the signal frequencies are allowed to vary and still be considered acceptable.

DTMF:

The dial pad allows you to adjust the column and row frequencies of the DMTF grid.

Minimum Power—Allows you to choose the minimum power required for the signal to be accepted as valid +/−Allowable Error—Error in percent that the signal frequencies are allowed to vary and still be considered acceptable.

Ring:

Minimum Frequency—Allows you select the minimum frequency component of the signal.

Maximum Frequency—Allows you to select the maximum frequency component of the signal.

Minimum Power—Allows you to choose the minimum power required for the signal to be accepted as valid Minimum Duration—Allows you to choose the minimum duration that the signal must be present in order to be accepted as valid.

Ringback:

High Frequency—Allows you select the high frequency component of the signal.

Low Frequency—Allows you to select the low frequency component of the signal.

Minimum Power—Allows you to choose the minimum power required for the signal to be accepted as valid +/−Allowable Error—Error in percent that the signal frequencies are allowed to vary and still be considered acceptable.

Busy:

Frequency—Allows you to select the frequency component of the signal.

Minimum Power—Allows you to choose the minimum power required for the signal to be accepted as valid +/−Allowable Error—Error in percent that the signal frequencies are allowed to vary and still be considered acceptable.

iii. FSK Decoding

The FSK decoding is contained in the options box on the tab labeled FSK. The following is a list of options and what they represent:

FREQ_TOLERANCE_Hz
FSK_TONE_DETECT_LIMIT_dbVrms
MIN_FSK_Sx
FRAMMING_ERROR_MAX
Automatic DROPOUT_LVL_dB
DROPOUT_SAMPLES
DEMOD_DELAY
DELAY_DEMOD_BPF
MIN_MARK_SAMPLES
MIN_STOPBIT_THRESHOLD
STUFF_MARK_THRESHOLD
Signal DROPOUT_LVL_dB

19. TRANSFERRING FILES

To transfer files from the device to a PC you must first set the options in the previous section. Then follow the following directions depending on the type of transfer you would like to do:

a. Establishing a Serial Connection

To begin a serial transfer, connect the device to the correct serial port of your computer to match the setting you should have chosen earlier. Make sure the device is powered on and start the TSA software. Choose Device connect from the menu bar and you will see a list of files on the device. If you do not, double check your device setting and repeat the previous steps.

b. Establishing a Modem Connection

To begin a modem transfer choose a modem in your device settings and set your modem to automatically answer incoming calls. Then with the TSA device dial the number of your modem with the instructions provided in the hardware section of this manual. If your connection fails, double check your device settings and repeat the previous steps. If your computer was set to automatically answer incoming calls, the computer will poll the box for all files marked for upload and will copy the files and then disconnect automatically. Otherwise it is treated the same way as a serial connection described in the next section.

c. Transfer

Once your connection has been established you will be presented with a list of files on the device. Choose the files you are interested in retrieving and click open or save depending on what you would like to accomplish. Open will copy the file and open it immediately in the software to begin analysis. Save will simply copy the file to the directory chosen earlier in your device settings. When you are done simply close the dialog box using the X in the top right corner and continue on with whatever you choose to do next. Files with voice notes are denoted with a VN in the dialog and files also show their size and name. You can choose multiple files using standard windows accelerators such as holding down shift or ctrl.

20. FIRMWARE

The firmware upgrade wizard allows the firmware in the TSA device to be upgraded in the field. This is located in the "Device" menu option and has directions within the wizard on it's operation.

21. EXAMPLES

The following examples illustrate some features of the analysis software. The display is divided into two main areas; the upper portion is the AC coupled signal and the lower portion displays the low frequency or DC coupled signal. Once the signal is analyzed all detected signals are displayed in the "hit line" along the top of each window. The hit line is context sensitive and will display more information upon zoom. For example, you can zoom in on an FSK signal until you see the bit level information including individual start, stop, stuffed mark and data bits.

Example 1

Type 1 Caller ID with 10 dB Twist

Signal capture of a Type 1 (on hook) FSK Caller ID transmission preceded by power ringing can be displayed by an embodiment of the invention. For example, the FSK has 10 dB of twist.

Example 2

Type 1 Caller ID with 10 dB Twist FSK Details Window

Double clicking any of the detected signals that are identified in the hit line will bring up a dialog box of parametric information. For example, a FSK dialog box can indicate a 10 dB of FSK twist on the signal.

Example 3

Type 2 Caller ID Transmission with EIU Check

Signal capture of a Type 2 (off hook) FSK Caller ID transmission with the CPE going on hook after the CAS tone to do an EIU (Extension in Use) check can be displayed by an embodiment of the invention.

Example 4

Type 2 Caller ID Zoomed In View of FSK Signaling

A Type 2 Caller-ID zoomed in view of FSK signaling can be displayed by an embodiment of the invention. Zooming on the FSK portion of the signal displays the Caller ID format down to the bit level. In this example, the start, stop and data bits can be shown with no framing errors or stuffed mark bits in this signal.

Example 5

Type 2 Caller ID Transmission with Multiple OSI

A Type 2 Caller-ID transmission with Multiple OSI. Signal capture of a Type 2 (off hook) FSK Caller ID transmission with CO (central office) generated OSI's (open switch intervals) can be displayed by an embodiment of the invention. The DC coupled channel identifies the periods where the battery voltage is removed as OSI's. For example, showing that there was an OSI preceding the SAS tone and following the FSK transmission.

Example 6

CAS Tone FFT Window

A CAS tone FFT window can be displayed by an embodiment of the invention. Double clicking the CAS hit and pressing the FFT button displays a Hanning windowed FFT and shows, for example, that the CAS tone had a 10 dB twist. It can also show the high frequency tone at 2750 Hz was right near the TIA speciation limit of −32 dBm and the FFT can show that there were no significant interference tones present.

Example 7

FSK Details Window with Multiple Impairments

An FSK details window with multiple impairments can be displayed by an embodiment of the invention. Double clicking the FSK hit can then show that the FSK had a low baud rate (1188 bps) and Mark frequency (1140 Hz) and a high Space frequency (2278 Hz) and an FSK twist of −2.1 dB. A colored box can clearly identify signals that are out of specification. For example, it can show that the Mark frequency is out of specification.

Example 8

CAS Tone Details Window

A CAS tone details window can be displayed by an embodiment of the invention. Double clicking the CAS hit can show that the CAS tone had, for example, a 10 dB twist and the high frequency tone at 2750 Hz was right near the TIA specification limit of −32 dBm and the FFT can show that there were no significant interference tones present.

Example 9

Zoomed In View of FSK Signaling with Stuffed Mark

A zoomed in view of FSK signaling with Stuffed Mark can be displayed by an embodiment of the invention wherein signal capture of a low level FSK transmission with stuffed mark can be shown. A zoomed image can show the stuffed mark between each byte of data.

Example 10

FSK Details Window of FSK with Stuffed Mark

An FSK details window of FSK with stuffed mark can be displayed by an embodiment of the invention. Double clicking on the FSK hit can show that the FSK transmission level was −42.1 dBm and that there was stuffed mark present and there was no signal dropout in the channel seizure or mark preamble.

Example 11

Outgoing Call with Stutter Dial Tone

An outgoing call with stutter dial tone can be displayed by an embodiment of the invention wherein signal capture of an outbound call with SDT (stutter dial tone) is shown. In this case the DC coupled channel can show the line condition as it transitions from idle to terminated and back to idle state. The AC channel can display the SDT presented on the line, followed by DTMF dialing and ringback tone.

Example 12

FSK Transmission with Large 60 Hz Noise Component

An FSK transmission with large 60 Hz noise component can be displayed by an embodiment of the invention wherein signal capture of an FSK Caller ID transmission with a strong 60 Hz noise component can be shown and in this case an example where the FSK is modulated by the 60 Hz tone.

Example 13

FSK Transmission with Large 60 Hz Noise Low Pass Filter View

An FSK transmission with large 60 Hz noise low pass filter view can be displayed by an embodiment of the invention. The software allows the data to be manipulated after a signal is captured. This image can show the same data above with a low pass filter applied such that a 60 Hz noise, for example, would be plainly evident.

Example 14

FSK Transmission with Large 60 Hz Noise Band Pass Filter View

An FSK transmission with large 60 Hz noise band pass filet view can be displayed by an embodiment of the invention. It would show the same signal with a band pass filter applied. The FSK would be plainly viewed without the interference tone. This is useful to determine if the data portion of the signal is within specification independent of the interference tone.

It should be understood that in certain situations for reasons of computational efficiency or ease of maintenance, the ordering and relationships of the blocks of the illustrated flow charts could be rearranged or re-associated by one skilled in the art.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer subsystem embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

It should be understood that the examples and embodiments described herein are for illustrative purposes only and that various modifications or changes in light thereof will be suggested to persons skilled in the art and are to be included within the spirit and purview of this application.

The invention claimed is:

1. A receiving apparatus for telephone signal collection comprising a portable field unit for capturing telephone signal data corresponding to telephone signals being normally transmitted over a telephone line, the telephone signals being generated by one or more sources other than the apparatus, wherein said field unit comprises:
   a connection interface for connecting to the telephone line and configured for receiving telephone signal data without transmitting signals to the telephone line;
   a signal recorder for digitally capturing the telephone signal data over a specified period by a plurality of simultaneous sampling methods, wherein a plurality of data streams result from each sampling method;
   data storage for storing said data streams as a data file; and
   an output port for transmitting the data file to a remote system.

2. The apparatus for telephone signal collection of claim 1 wherein said sampling methods comprise distinct sampling rates.

3. The apparatus for telephone signal collection of claim 1 wherein said sampling methods comprise distinct input sensitivity levels.

4. The apparatus for telephone signal collection of claim 1 wherein the sampling methods comprise distinct sampling rates and distinct input sensitivity levels.

5. The apparatus for telephone signal collection of claim 1 further comprising a voice recorder for recording a voice file, wherein said voice file is associated with the data file.

6. The apparatus for telephone signal collection of claim 1 wherein a plurality of data files, each representing a specified period of captured telephone signal data from one or more distinct telephone lines, is stored.

7. The apparatus for telephone signal collection of claim 1 wherein the connection interface comprises a tip ring interface.

8. The apparatus for telephone signal collection of claim 1 wherein the telephone signal data comprises at least one of on hook transitions, off hook transitions, OSI, line reversals, call waiting extension in use, voice, DTMF, call process tones, FSK for caller ID, text messaging, CAS, SAS, DTAS, and voice band signals.

9. The apparatus for telephone signal collection of claim 1 wherein the signal recorder comprises analog-to-digital converters for converting analog telephone signal data into digital signal data.

10. The apparatus for telephone signal collection of claim 9 wherein the signal recorder comprises a digital signal processor for receiving the digital signal data, converting the digital signal data into a data file, and automatic naming of the file using a time/date function.

11. The apparatus for telephone signal collection of claim 1 wherein the signal recorder comprises a user interface to allow for manual starting or stopping recording over the specified period.

12. The apparatus for telephone signal collection of claim 1 wherein the signal recorder comprises a programmable triggering function for starting or stopping recording over the specified period.

13. The apparatus for telephone signal collection of claim 12 wherein the programmable triggering function comprises trigger modes selected from one of Ring/Off hook events, FSK events, CAS events, DC level changes, AC level changes, and user defined events.

14. The apparatus for telephone signal collection of claim 5 wherein the voice recorder comprises a user interface to allow for manual starting or stopping for recording audible voice data.

15. The apparatus for telephone signal collection of claim 1 wherein the output port comprises a communication link for transferring the data file to the remote system.

16. The apparatus for telephone signal collection of claim 1 wherein the remote system comprises a system for analyzing the data file.

17. The apparatus for telephone signal collection of claim 1 wherein the remote system comprises a system for playback of the voice data and telephone signal data.

18. The apparatus for telephone signal collection of claim 1 further comprising a visual display for displaying AC and DC voltages measured on the connection interface.

19. The apparatus for telephone signal collection of claim 1 further comprising audio output for playback of telephone signal data.

20. The apparatus for telephone signal collection of claim 1 further comprising audio output for playback of voice data.

21. The apparatus for telephone signal collection of claim 1 further comprising user input device.

22. The apparatus for telephone signal collection of claim 1 further comprising a connection port for receiving external control signals from a remote device.

23. The apparatus for telephone signal collection of claim 1 further comprising a hook switch function allowing the field unit to go off hook and terminate the line.

24. The apparatus for telephone signal collection of claim 23 further comprising a CAS detector that acknowledges call waiting signals on the line.

25. The apparatus for telephone signal collection of claim 1 further comprising a decoder for Caller-ID.

26. A system for telephone signal analysis, the system being in communication with a remote unit configured for capturing telephone signal data corresponding to telephone signals being normally transmitted over a telephone line, the telephone signals being generated by one or more sources other than the remote unit, the remote unit capturing the telephone signal data without transmitting signals to the telephone line, the system comprising:
   a communications link for receiving a data file from the remote unit wherein the data file comprises a plurality of data streams simultaneously recorded using different sampling methods of telephone signal data over a specified period;
   a signal processing unit for processing the plurality of simultaneously recorded data streams into a reconstructed telephone signal which substantially represents the telephone signal data recorded by the remote unit;
   an analyzer for telephone signal analysis; and
   visual display for graphical output of the reconstructed telephone signal and results of the telephone signal analysis.

27. The system for telephone signal analysis of claim 26 wherein the data file comprises at least one of
   (a) on hook and off hook caller ID timings, signaling, and protocols,
   (b) VWMI timings, signaling, and protocols,
   (c) DTMF,
   (d) Call Progress tones,
   (e) power ringing,
   (f) single frequency interference signals,
   (g) power line harmonics,
   (h) ADSI timing and signaling,
   (i) Wireline SMS timing and signaling, and
   (j) FSK signaling.

28. The system for telephone signal analysis of claim 26 wherein the reconstructed telephone signal is used in a telephone line simulation system.

29. The system for telephone signal analysis of claim 26 wherein the signal processing unit comprises a routine operative to modify signals from the plurality of data streams into a modified-reconstructed telephone signal which substantially represents the telephone signal data recorded by the remote unit with modifications.

30. The system for telephone signal analysis of claim 26 wherein the signal processing unit comprises a routine operative to dynamically change signaling definitions.

31. The system for telephone signal analysis of claim 26 further comprising a storage device for storing the data file.

32. The system for telephone signal analysis of claim 26 wherein the data file further comprises pre-recorded voice data associated therewith, whereby the voice data provides an annotated subjective observation regarding the telephone signal data over a specified period.

33. The system for telephone signal analysis of claim 26 further comprising functionality for remotely controlling the remote unit.

34. The system for telephone signal analysis of claim 33 wherein the functionality for remotely controlling the remote unit comprises remote controlling of triggering of the recording over the specified period.

35. The system for telephone signal analysis of claim 26 wherein the signal processing unit comprises a routine operative to classify the data according to predetermined criterion.

36. The system for telephone signal analysis of claim 35 wherein the classification includes protocol analysis.

37. The system for telephone signal analysis of claim 36 wherein the signal processing unit comprises a routine operative to display the protocol analysis of the classified signals.

38. The system for telephone signal analysis of claim 26 wherein the signal processing unit comprises a routine operative to indicate out of range data according to predetermined criterion.

39. A system for telephone signal collection and analysis comprising a portable field unit for capturing telephone signal data corresponding to telephone signals being normally transmitted over a telephone line, the telephone signals being generated by one or more sources other than the portable field unit, and a central analysis system wherein the field unit comprises:
   (a) a connection interface for connecting to the telephone line and configured for receiving telephone signal data without transmitting signals to the telephone line;
   (b) a signal recorder for digitally capturing the telephone signal data over a specified period by a plurality of simultaneous sampling methods, wherein a plurality of data streams result from each sampling method;
   (c) data storage for storing said data streams as a data file; and
   (d) an output port for transmitting the data file to a central analysis system, wherein the central analysis system comprises:
      (i) communications link for receiving the data file from the field unit;
      (ii) a signal processing unit for processing the plurality of simultaneously recorded data streams into a reconstructed telephone signal which substantially represents the telephone signal data recorded by the field unit;
      (iii) an analyzer for telephone signal analysis; and
      (iv) visual display for graphical output of the reconstructed telephone signal and results of the telephone signal analysis.

40. A method of data capture by a field unit comprising
   (a) receiving telephone signal data;
   (b) recording AC and DC data samples;
   (c) merging AC and DC data samples into single data stream;
   (d) rotating data stream through pre-trigger buffer;
   (e) monitoring for trigger event;
   (f) if trigger event, then creating a new file, else return to step (e);
   (g) streaming data from pre-trigger buffer into the new file;
   (h) if stop or timeout event, then stop streaming data into the file and close file, else return to step (g); and
   (i) return to step (e).

41. The method of data capture of claim 40 further comprising recording voice data and associating the voice data with the new file.

42. The method of data capture of claim 40 further comprising transferring the file from a field unit to a remote signal analysis system.

43. The method of data capture of claim 40 wherein said transferring comprises:
   (i) confirming connection of field unit to remote signal analysis system;
   (ii) transferring a file list from field unit for display on remote signal analysis system;
   (iii) receiving selection of files for transfer;
   (iv) transferring a selected file from a field unit to a remote signal analysis system;
   (iv) decompression of data from the selected file;
   (v) parsing AC and DC data samples from the selected file;
   (vi) conditioning of AC and DC samples; and
   (vii) displaying of AC and DC samples on remote signal analysis system.

44. A method of data analysis of telephone signal data on a remote signal analysis system wherein the data is transferred from a field unit to the remote signal analysis system, comprising:
   (a) receiving an analyze event command;
   (b) performing a power spectral analysis on the data, wherein the data comprises AC and DC data;
   (c) dividing the AC and DC data into time domain regions based on power spectral analysis;
   (d) performing fast Fourier transform on each of said regions;
   (e) classifying each region by comparison to predetermined criteria; and
   (f) displaying parametric properties for each region.

45. The method of data analysis of telephone signal data on a remote signal analysis system of claim 44 wherein the data is transferred from the field unit to the remote signal analysis system by:
   (i) confirming connection of field unit to remote signal analysis system;
   (ii) transferring a file list from field unit for display on remote signal analysis system;
   (iii) receiving selection of files for transfer;
   (iv) transferring a selected file from a field unit to a remote signal analysis system;
   (iv) decompression of data from the selected file;
   (v) parsing AC and DC data samples from the selected file;
   (vi) conditioning of AC and DC samples; and
   (vii) displaying of AC and DC samples on remote signal analysis system.

46. The method of data analysis of telephone signal data on a remote signal analysis system of claim 44 further comprising playing of voice data associated with the data.

47. A method of data analysis for CAS tone of telephone signal data on a remote signal analysis system wherein the data is transferred from a field unit to the remote signal analysis system, comprising:
   (a) receiving data from field unit;
   (b) performing power spectral analysis on AC portion of data;
   (c) determining start and stop points of individual signals as regions;
   (d) applying CAS filter to data by removing all outside frequencies;
   (e) performing FFT on data;
   (f) searching for frequencies corresponding to predetermined frequencies for CAS;
   (g) comparing duration of region to predetermined duration for CAS;
   (h) comparing frequency amplitude to predetermined amplitudes for CAS;
   (i) comparing differences in frequency amplitude (twist) to predetermined amplitudes for CAS;
   (j) as a result of the comparisons of steps (g)–(j), graphically displaying the region as a CAS tone.

48. A method of data analysis for CAS tone of claim 47 further comprising displaying parametric data wherein said parametric data comprises at least one of duration, amplitude, and twist.

* * * * *